US011530655B1

(12) United States Patent
Hesketh et al.

(10) Patent No.: US 11,530,655 B1
(45) Date of Patent: Dec. 20, 2022

(54) SYSTEMS AND METHODS FOR CONTROLLING ENGINE TORQUE

(71) Applicant: Ford Global Technologies, LLC, Dearborn, MI (US)

(72) Inventors: David Hesketh, Ingatestone (GB); David Cox, London (GB); Themi Petridis, Bishop's Stortford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/398,782

(22) Filed: Aug. 10, 2021

(51) Int. Cl.
*F02D 29/00* (2006.01)
*F01N 3/20* (2006.01)
*F02D 41/08* (2006.01)

(52) U.S. Cl.
CPC ........... *F02D 29/00* (2013.01); *F01N 3/2013* (2013.01); *F02D 41/083* (2013.01); *F02D 2200/0802* (2013.01); *F02D 2200/50* (2013.01)

(58) Field of Classification Search
CPC ..... F01N 3/2013; B60W 10/06; B60W 10/08; B60W 20/10; B60W 2710/0666; B60Y 2200/91; B60Y 2300/91; B60Y 2400/11; B60Y 2400/112; F02N 2200/022; F02D 41/083; F02D 2200/0802; F02D 2200/50; F02D 29/00; B60L 2240/443; B60L 2260/26
See application file for complete search history.

(56) References Cited

U.S. PATENT DOCUMENTS

| 5,319,929 | A | | 6/1994 | Cornelison et al. |
| 5,488,283 | A | | 1/1996 | Dougherty et al. |
| 5,528,148 | A | | 6/1996 | Rogers |
| 5,942,862 | A | * | 8/1999 | Yamada ................... B60K 6/52 903/906 |
| 2001/0039230 | A1 | * | 11/2001 | Severinsky ........... B60W 20/30 180/65.23 |
| 2010/0256849 | A1 | * | 10/2010 | Akimoto ............. F02D 41/0005 180/65.265 |
| 2013/0253747 | A1 | * | 9/2013 | Amano ................. B60W 10/08 180/65.265 |
| 2020/0122712 | A1 | * | 4/2020 | Miki ....................... B60L 50/15 |

FOREIGN PATENT DOCUMENTS

FR    3070720    3/2019

* cited by examiner

*Primary Examiner* — Audrey B. Walter
*Assistant Examiner* — Dapinder Singh
(74) *Attorney, Agent, or Firm* — Haley Guiliano LLP

(57) ABSTRACT

Methods and system are provided to control engine torque of an engine of a vehicle. The methods comprise determining a drive torque demand on a crankshaft of an engine; determining an accessory torque demand on the crankshaft, the accessory torque demand comprising a first torque demand from a first e-machine and a second torque demand from a second e-machine; determining whether the sum of the drive torque demand and the accessory torque demand is greater than a usable torque capacity output from the engine crankshaft, and increasing a speed of the engine in response to determining that the sum of the drive torque demand and the accessory torque demand is greater than the usable torque capacity output from the engine crankshaft.

16 Claims, 11 Drawing Sheets

SYSTEMS AND METHODS FOR CONTROLLING ENGINE TORQUE

BACKGROUND

The present disclosure relates to systems and methods for controlling engine torque, more particularly, but not exclusively, to systems and methods for controlling an engine speed in response to a drive torque and an accessory torque demand being larger than a torque output of an engine.

SUMMARY

Through consumer demand and local regulation, the need for reduced engine emissions has led to engine exhaust systems that comprise catalytic converters. As the demand for cleaner emissions increases and legislation requires a reduction in the pollutants produced by internal combustion engines, solutions involving after-treatment systems are increasingly desired. Catalytic converters are a specific type of engine exhaust after-treatment system that reduces pollutants in exhaust gases by catalyzing a redox reaction. However, Like many after-treatment systems, catalytic converters require heating up to be most effective, therefore, electrically heated catalytic converters (eCATs) are utilized to assist in catalyst light off. In Hybrid Electric Vehicles (HEVs) and Mild Hybrid Electric Vehicles (mHEVs), a system to supply power to the eCAT is conventionally used, however, the additional strain this may put on a system requires a novel method of controlling engine torque.

In addition, eCATs are being used in non-hybrid vehicles. For example, in a vehicle, with dual alternators that supply electrically isolated and independent electrical systems. In this disclosure, much of the detail in the specification may be used in hybrid vehicles, or non-hybrid vehicles, as examples; however, it should be understood that the disclosures herein can apply equally to all vehicle platforms, or engine after-treatment systems in general, that have catalysts that utilize an eCAT to assist in catalyst light-off.

Therefore, according to a first example in accordance with an aspect of the disclosure, there is provided a method of controlling engine torque, e.g., of an engine of a vehicle. The method comprises determining a drive torque demand on a crankshaft of an engine; determining an accessory torque demand on the crankshaft, the accessory torque demand comprising a first torque demand from a first electric machine, e-machine, (e.g., a first alternator or a first motor-generator) and a second torque demand from a second e-machine (e.g., a second alternator or a second motor-generator); determining whether the sum of the drive torque demand and the accessory torque demand is greater than a torque capacity output from the engine crankshaft (e.g., the amount of torque output from the crankshaft available for use by one or more components coupled to the crankshaft), and increasing a speed of the engine in response to determining that the sum of the drive torque demand and the accessory torque demand is greater than the torque capacity output from the engine crankshaft. In some examples, the accessory torque demand as defined herein may consist of, e.g., only of, a torque demand from multiple e-machines.

In some examples, increasing the speed of the engine comprises increasing an idle speed of the engine to a predetermined limit.

In some examples, the method further comprises electrically connecting the first e-machine to a first powernet and electrically connecting the second e-machine to a second powernet, wherein the first powernet and the second powernet are electrically isolated from each other.

In some examples, the method further comprises determining whether an electrical power output from the first e-machine satisfies a first electrical demand of the first powernet. In some examples, the method further comprises determining whether an electrical power output from the second e-machine satisfies a second electrical demand of the second powernet In some examples, the method further comprises determining a state of charge of a first battery electrically connected to the first e-machine, e.g., in response to determining that the electrical power output from the first e-machine does not satisfy the first electrical demand. In some examples, the method further comprises deactivating one or more electrical components of the first powernet, e.g., in response to the state of charge of the first battery being less than a predetermined first state of charge limit or discharging the first battery of the first powernet in response to the state of charge of the first battery being above the predetermined first state of charge limit.

In some examples, the method further comprises determining a state of charge of a second battery electrically connected to the second e-machine, e.g., in response to determining that the electrical power output from the second e-machine does not satisfy the second electrical demand. In some examples, the method further comprises discharging the second battery of the second powernet, e.g., in response to the state of charge of a second battery being above a predetermined second state of charge limit.

In some examples, the method further comprises charging a first battery electrically connected to the first e-machine, e.g., in response to determining that the electrical power output from the first e-machine satisfies the first electrical demand of the first powernet. In some examples, the method further comprises charging a second battery electrically connected to the first e-machine, e.g., in response to determining that the electrical power output from the second e-machine satisfies the second electrical demand of the second powernet.

In some examples, the second powernet comprises an electrically heated catalyst (eCAT). In some examples, the method further comprises determining whether the temperature of an engine after-treatment system is below a predetermined temperature threshold. In some examples, the method further comprises activating the electrically heated catalyst in response to the temperature of an engine after-treatment system being below the predetermined temperature threshold.

According to a second example in accordance with an aspect of the disclosure, there is provided an engine comprising a crankshaft, the engine being coupled to a first e-machine, a second e-machine, and a controller. The controller is configured to determine a drive torque demand on a crankshaft of an engine; determine an accessory torque demand on the crankshaft, the accessory torque demand comprising a first torque demand of the first e-machine and a second torque demand of the second e-machine; determine whether the sum of the drive torque demand and the accessory torque demand is greater than a torque output from the crankshaft, and increase a speed of the engine in response to determining that the sum of the drive torque demand and the accessory torque demand is greater than the torque output from the crankshaft.

According to a third example in accordance with an aspect of the disclosure, there is provided a vehicle comprises an engine. In some examples, the engine comprises a crankshaft and is coupled to a first e-machine, a second e-machine, and a controller. The controller is configured to determine a drive torque demand on a crankshaft of an engine; determine an accessory torque demand on the crankshaft, the accessory torque demand comprising a first torque demand of the first e-machine and a second torque demand of the second e-machine; determine whether the sum of the drive torque demand and the accessory torque demand is greater than a torque output from the crankshaft, and increase a speed of the engine in response to determining that the sum of the drive torque demand and the accessory torque demand is greater than the torque output from the crankshaft.

According to a fourth example in accordance with an aspect of the disclosure, there is provided a non-transitory computer-readable medium having instructions encoded thereon for carrying out a method of controlling engine torque, that, when executed by control circuitry, cause the control circuitry to determine a drive torque demand on a crankshaft of an engine; determine an accessory torque demand on the crankshaft, the accessory torque demand comprising a first torque demand from a first e-machine and a second torque demand from a second e-machine; determine whether the sum of the drive torque demand and the accessory torque demand is greater than a torque output from the engine crankshaft and increase a speed of the engine in response to determining that the sum of the drive torque demand and the accessory torque demand is greater than the torque output from the engine crankshaft.

For the avoidance of doubt, the system and methods for providing heat to a catalyst of an after-treatment system for a vehicle, according to any of the examples described herein, may be used to improve the emissions of a vehicle. Whilst the benefits of the systems and method may be described by reference to hybrid vehicles, it is understood that the benefits of the present disclosure are not limited to such types of vehicle, and may also apply to other types of vehicles, such as forklifts, trucks, buses, locomotives, motorcycles, aircraft and watercraft, and/or non-vehicle based systems that utilize a catalytic converter, such as electrical generators, mining equipment, stoves, and gas heaters.

These examples and other aspects of the disclosure will be apparent and elucidated with reference to the example(s) described hereinafter. It should also be appreciated that particular combinations of the various examples and features described above and below are often illustrative and any other possible combination of such examples and features are also intended, notwithstanding those combinations that are clearly intended as mutually exclusive.

BRIEF DESCRIPTION OF THE DRAWINGS

The above and other objects and advantages of the disclosures herein will be apparent upon consideration of the following detailed description, taken in conjunction with the accompanying drawings, in which.

DETAILED DESCRIPTION

Figure 1:
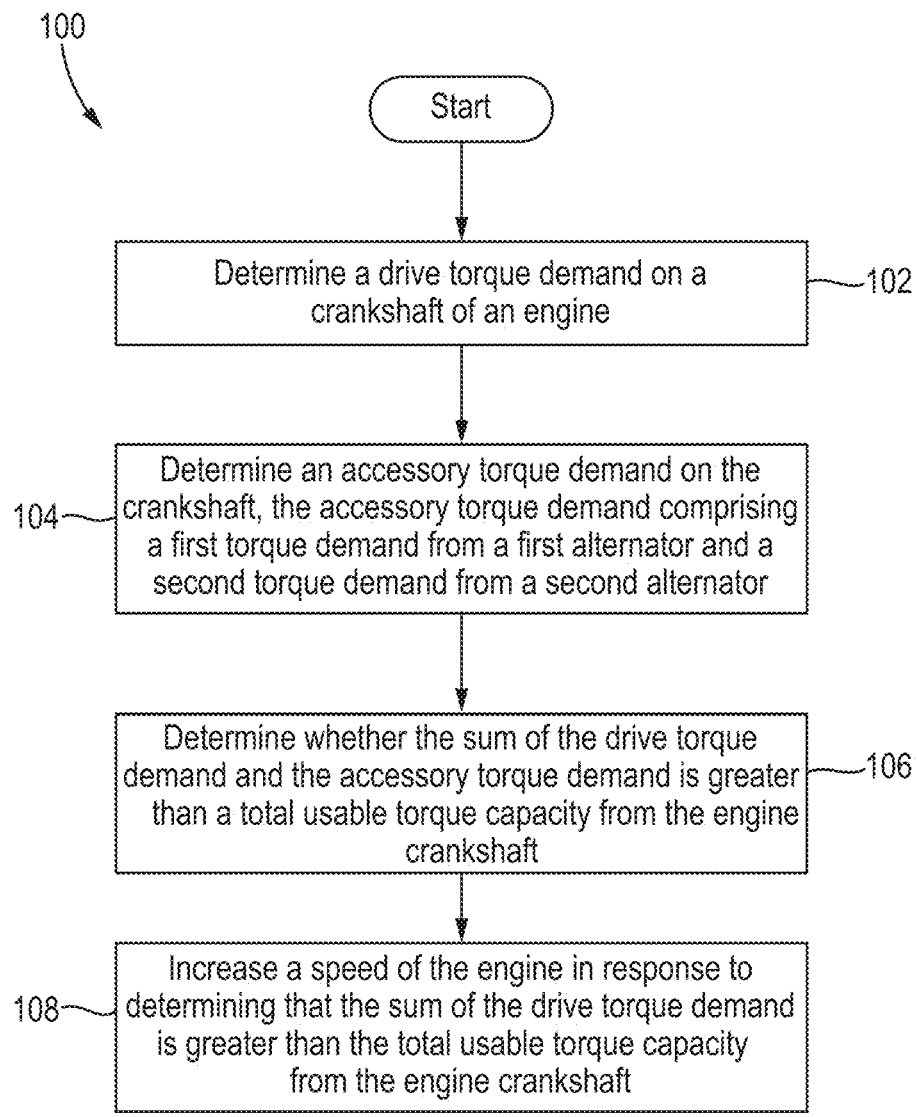
FIG. 1 illustrates an example flow chart of a method of controlling engine torque, in accordance with at least one of the examples described herein.

It should be understood that the detailed description and specific examples herein while indicating exemplary embodiments, are intended for purposes of illustration only and are not intended to limit the scope of the disclosure. These and other features, aspects, and advantages of the present disclosure will become better understood from the following description, appended claims, and accompanying drawings. It should be understood that the Figures are merely schematic and are not drawn to scale. It should also be understood that the same or similar reference numerals are used throughout the Figures to indicate the same or similar parts.

As discussed briefly above, current regulations on emissions standards are requiring manufacturers of internal combustion engines to reduce the operating emissions from the engines they manufacture. These engines are used in any appropriate type of vehicle, such as an automobile, a motorbike, a marine vessel, or an aircraft. In particular, the vehicle may be any appropriate type of hybrid vehicle, such as a Hybrid Electric Vehicle (HEV), a Plug-in Hybrid Electric Vehicle (PHEV), a Mild Hybrid Electric Vehicle (mHEV), or any other vehicle having an engine and an electrified powertrain. Typically, hybrid vehicles use two or more distinct types of means to store energy, such as batteries to store electrical energy and gasoline/diesel to store chemical energy. The basic principle of hybrid vehicles is that the different types of motors have diverse efficiencies under different conditions, such as top speed, torque, or acceleration and therefore switching from one type of motor to another yields greater efficiencies than either one could have their own. However, under the proposed new emissions standards in markets such as the European Union (EU), North America (e.g., USA and Canada), and the United Kingdom (UK), the increased efficiencies of hybrid vehicles may be insufficient to satisfy new emission standards.

One solution to reduce the emissions of vehicles is the use of an exhaust after-treatment system. Exhaust after-treatment systems aim to reduce hydrocarbons, carbon monoxide, nitrous oxide, particulate matter, sulfur oxide, and volatile organic compounds such as chlorofluorocarbons. Examples of exhaust after-treatment systems include air injection (or secondary air injection), exhaust gas recirculation, and catalytic converters.

Electrically heated catalysts, or eCATs, are a type of catalytic converter that has been in use for a number of years. An eCAT typically comprises a heating element disposed within, or near to, a catalyst. eCATs are required in various use cases and may demand a power supply between 0-2 kW (0 to 2000 Watts) for example, depending on the use case. For example, one or more heating elements within an eCAT in a non-hybrid vehicle will typically have a thermal output of 0-2 kW (0 to 2000 Watts), whereas, in a hybrid vehicle, the one or more heating elements with the eCAT will typically have a thermal power output of 0-4 kW (0 to 4000); however, these numbers are for illustration purposes and are not intended to be limiting. In addition, within the non-hybrid vehicle platform, to make up for the lower thermal output of one or more heating elements, an extended heat time is often required.

An eCAT typically has low inductance and therefore the power consumption can be changed rapidly. The eCAT demand is supported by the vehicle's electrical system, which may be the hybrid powertrain in an HEV, mHEV, or PHEV platform; or, an additional 12V/24V battery in a non-hybrid vehicle. For example, in a cold start use case, the eCAT will demand a high rated power (e.g., ~2 kW) to maintain after-treatment temperature. In some examples, a power control module (PCM) of a vehicle demands the high rated power from the vehicle's electrical system for ~200 seconds.

When the vehicle is a hybrid, in some examples, the additional load due to demand from the eCAT will be supported by the hybrid battery transiently until the e-machine can respond to support the load. However, in some use cases in which the e-machine can't support the total demand, the battery will need to support the eCAT power supply.

In some examples, when modulating the power to the eCAT, the solution should achieve various goals: avoid step changes in mechanical load presented to the engine crankshaft, and/or avoid step changes in electrical load on the vehicle bus that would lead to unacceptable voltage fluctuations. Two potential solutions are to 1) use a second DCDC converter, driven from the 48V bus, to drive the eCAT. This has the advantage of allowing continuous and slow control so that the torque to a belt-integrated starter generator (BISG) and the power to the eCAT can be perfectly matched, and 2) use slow on/off switching of the eCAT, with the BISG torque moved slowly to match the demand, and the 48V battery providing the deficit in required power via charge/discharge current. However, both of these solutions are expensive.

Within a non-hybrid vehicle, one solution comprises using a pair of 12V alternators to meet the power demands of the vehicle and the eCAT (which would replace the 48V BISG in a hybrid vehicle and eliminate the need for a high voltage (e.g., 48V) battery), which is an attractive alternative. But such a system may typically have poor 12V bus voltage regulation.

Accordingly, in some examples according to the present disclosure, there is provided a system comprising two isolated 12V systems. In some examples, the first 12V system is a base vehicle power supply system comprising a conventional lead-acid battery, a collection of bus loads, and a first 12V alternator. The second 12V system is configured to provide power to an eCAT and comprises a second alternator, with a 12V battery, the eCAT, and a relay (e.g., PWM switch or solid-state switch) or a DCDC converter to switch and modulate the eCAT on and off.

In some examples, the second 12V system is electrically isolated from the first 12V system. As the eCAT is turned on, power is drawn only from the second 12V battery. The power output of the second alternator is then ramped up from zero, presenting no unacceptable load transient to the crankshaft, until the discharge power from the second battery is zero and the discharge energy has been replaced. When the eCAT is switched off, the voltage on the bus will rise sharply (depending on the charge acceptance/impedance of the battery) and the alternator load can be ramped down within a second or so, with a coordinated change in engine torque. In some examples, the second battery comprises a battery monitoring system (similar to a conventional base vehicle battery monitoring system) to monitor its health for diagnostic purposes and to manage the long-term state of charge within an appropriate operating window.

In particular, the systems and methods described herein may be used to address the light-off procedure of a catalyst in an eCAT in any vehicle, and/or to increase the life of the battery of the hybrid vehicle, e.g., by minimizing the HEV battery energy throughout during eCAT use, and limiting the degradation in its discharge and charge performance over its life, e.g., by reducing the energy throughput and internal resistance increase over-usage. Moreover, in some examples, the HEV battery may be replaced with a smaller alternative, which is more cost-effective in production. Conversely, in non-hybrid vehicles, adding in a second low voltage (e.g., 12V) power supply to power an eCAT is a relatively cost-effective way of adding an eCAT and power supply to an existing platform, either before- or aftermarket. For the avoidance of doubt, any of, or at least any part of, the system architectures described below may be implemented in any appropriate vehicle, and are not limited to implementation in any one type of non-hybrid or hybrid vehicle.

FIG. 1 illustrates an example flow chart of a method of controlling engine torque, in accordance with at least one of the examples described herein. In some examples, the engine comprises a crankshaft, the engine being coupled to a first alternator, a second alternator, and a controller. Process 100 starts at step 102 where a drive torque demand on a crankshaft of an engine is determined. In some examples, an electrical power control system for a vehicle (hereinafter referred to a "the system") may determine one or more operational parameters of the engine to determine a drive torque demand on the crankshaft. For example, the system may determine horsepower, revolutions per minute (RPM), work done, fuel consumption, accelerator bias, engine speed, air pressure, or the like.

At step 104, the system determines an accessory torque demand on the crankshaft, the accessory torque demand comprising a first torque demand from a first alternator and a second torque demand from a second alternator. In some examples, the accessory torque demand may comprise a third torque demand, wherein the source of the third torque demand is one or more of air conditioning, transmission, turbo, supercharger, water pump, air pump, air compressor, radiator fans, or the like. The order of the steps in FIG. 1 is for illustrative purposes and, in some examples, step 104 may precede step 102. The first and second alternators may be referred to as electricity generators. In some examples, in the case of a hybrid vehicle, for example, the second alternator may be any other type of e-machine, such as a BISG. In some examples, the e-machine may act as an motor-generator; in some instances, applying negative torque to the crankshaft, but may also provide positive torque to the crankshaft when acting as a motor. Accordingly, the scope of the present disclosure includes examples comprising a first and/or second e-machine (as opposed to a first and/or second alternator) that can provide positive and negative torque to the crankshaft.

At step 106, the system determines whether the sum of the drive torque demand and the accessory torque demand is greater than a total usable torque capacity from the engine crankshaft. For example, the system ensures that the total usable torque capacity does not exceed 100%, to prevent the engine from stalling in extreme use cases in which a reserve of engine torque capacity is required, i.e., a minimum reserve of torque for vehicle launch.

At step 108, the system increases the speed of the engine in response to determining that the sum of the drive torque demand is greater than the total usable torque capacity from the engine crankshaft. For example, if the engine speed is not increased there is a potential that the available torque capacity from the engine may be less than the sum of the torque demand and the engine crankshaft will be saturated. In this situation the engine may stall on pull-away or acceleration demand from the engine operator, resulting in poor user experience.

In some examples, the load demands on the engine are balanced in order of priority to avoid crank saturation and engine stalling. For example, an order of priority may be: support critical 12V loads (e.g., to keep the engine running); drive vehicle (e.g., launch vehicle); power eCAT, to meet emissions standards (e.g., using the second alternator); support non-critical 12V loads (e.g., heated seats/heated steering wheel, air conditioning, etc.); and charge one or more battery supplies, in this way, the load for the first alternator (e.g., for a first 12V system) is reduced as it is no longer needed to support the 12V load. In some examples, one or more accessory torque demand sources may be turned off, e.g., if an increased engine speed does not drive the first alternator and/or the second alternator fast enough to satisfy the total load of some of, or all of, the 12V demands.

Figure 2:
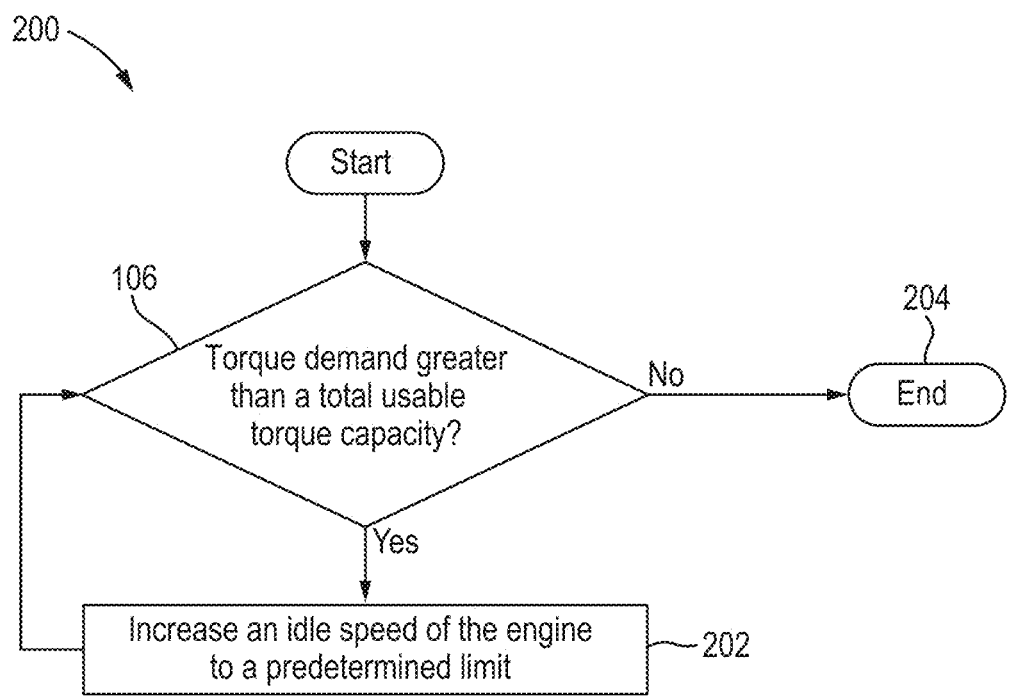
FIG. 2 illustrates an example flow chart of a method of determining the torque demand on or placed upon an engine, in accordance with at least one of the examples described herein.

FIG. 2 illustrates an example flow chart of a method of controlling engine speed, in accordance with at least one of the examples described herein. Process 200 starts at step 202, which may be carried out in a similar manner to step 106 of process 100, i.e., the determination of whether the sum of the drive torque demand and the accessory torque demand is greater than a total usable torque capacity from the engine crankshaft, or in other words, the determination of whether the torque demand is greater than the total usable torque capacity. For example, the engine torque output might not be at its maximum capacity, there may be spare capacity that could be used to support the load. I.e., there may be an opportunity to apply more load before the torque threshold is met and action needs to be taken to mitigate stall. If, for example, the system determines the torque demand is already greater than the torque output of the engine, then the engine will have already stalled, hence there is a need to take action and mitigate before that point is reached.

If the answer to step 202 is yes, process 200 continues to step 206. At step 206, the idle speed of the engine is increased to a predetermined limit. If the response to step 202 is no, process 200 continues to step 204. At step 204, process 200 ends.

In some examples, the crank torque of the engine will not be increased. For example, a proportion of the available crank torque will be protected for vehicle launch, by limiting or reducing the accessory torque demand. As mentioned above with reference to FIG. 1, in some examples, there is an order of preference of reducing the accessory torque demand on the crankshaft or increasing the torque output from the engine crankshaft. For example, increasing the speed of the engine, not necessarily the torque. In this way, increasing the speed of the engine drives the alternators faster so that they generate more electricity.

In some examples, the engine speed is increased by 200 to 500 RPM, for example, 300 RPM. However, any increase in RPM is considered within the scope of this disclosure. It should be noted that increasing the engine speed may increase the max engine torque available or total torque slightly, however, there will be an increase in accessory torque to offset the increased torque. Accordingly, the engine speed is increased to increase the speed of the first and second alternators.

Figure 3:
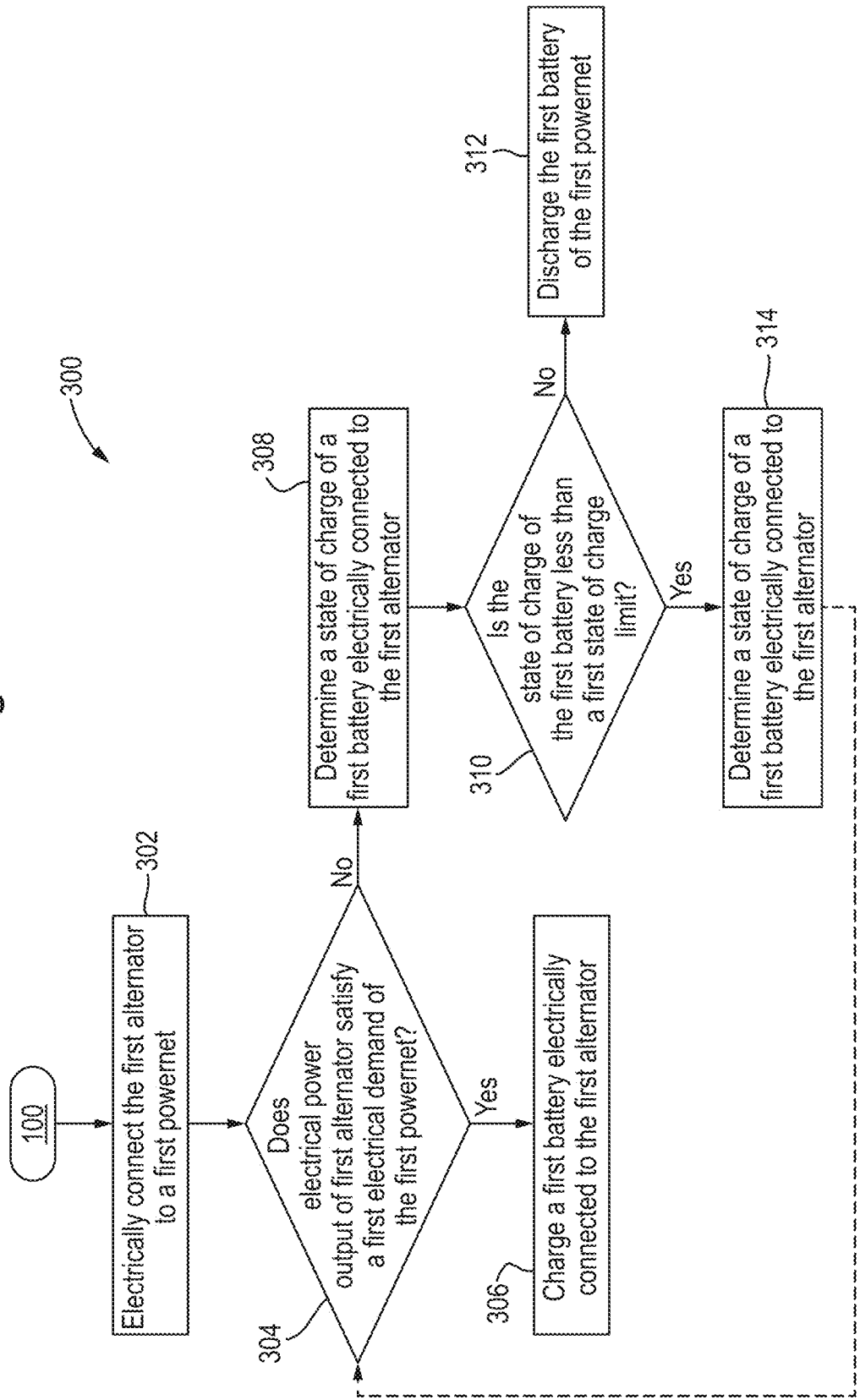
FIG. 3 illustrates an example flow chart of a method of determining if the electrical power output of a first alternator coupled to an engine satisfies a first electrical demand of a first powernet, and taking subsequent actions, in accordance with at least one of the examples described herein.

FIG. 3 illustrates an example flow chart of a method of determining if the electrical power output of a first alternator coupled to an engine satisfies a first electrical demand of a first powernet, and subsequent actions to be taken, in accordance with at least one of the examples described herein. Process 300, as shown, may optionally start after process 100. However, any one or more of the steps in process 300 may also be performed in parallel to any one or more of the steps of process 200 and/or process 100.

Process 300 begins at step 302. At step 302, the system electrically connects the first alternator to a first powernet.

At step 304, the system determines if the electrical power output of the first alternator satisfies a first electrical demand of the first powernet. For example, the system determines if the first alternator is generating enough electrical power to charge a first battery.

If the answer to step 304 is yes, process 300 continues to step 306. At step 306, the system charges a first battery electrically connected to the first alternator.

If the answer to step 306 is no, process 300 continues to step 308. At step 308, the system determines a state of charge of a first battery connected to the first alternator. For example, the system may determine that the state of charge of the first battery is at 35%.

At step 310, the system determines if the state of charge of the first battery is less than a first state of charge limit. For example, the system may determine that the 35% current state of charge of the first battery is less than a charge limit threshold, such as 40%.

If the answer to step 310 is no, the process continues to step 312. At step 312, the system discharges the first battery of the first powernet. For example, in this scenario, the battery state of charge is greater than the lower threshold or first charge limit, and therefore, although the alternator is not charging the battery at a sufficient rate, the system can continue to power the systems powered by the first powernet by discharging the first battery.

If the answer to step 310 is yes, the process continues to step 314. At step 314, the system deactivates one or more "non-critical" electrical components of the first powernet. For example, the system may deactivate one or more of: an air conditioning unit, heated seats, heated steering wheel, non-essential lighting, infotainment systems, climate controls, or the like. In this way, the accessory demand will decrease. Ideally, the electrical components deactivated will change the ratio of the electrical power output of the first alternator to the electrical demand of the first powernet, such that the answer to step 304 is yes. Accordingly, after step 314, the process 300 may optionally return to step 304.

Figure 4:
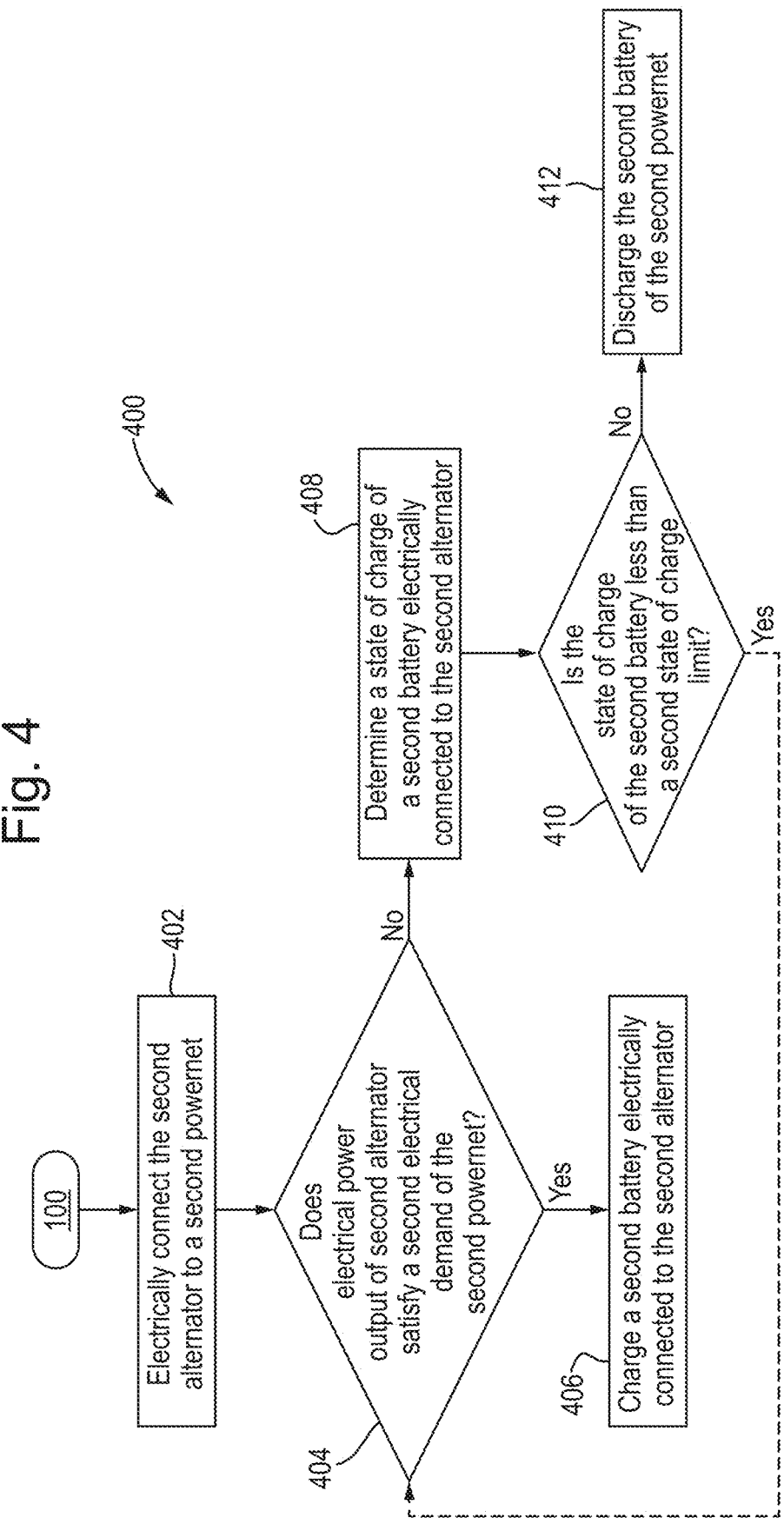
FIG. 4 illustrates an example flow chart of a method of determining if the electrical power output of a second alternator coupled to an engine satisfies a second electrical demand of a second powernet, and taking subsequent actions, in accordance with at least one of the examples described herein.

FIG. 4 illustrates an example flow chart of a method of determining if the electrical power output of a second alternator coupled to an engine satisfies a second electrical demand of a second powernet, and taking subsequent actions, in accordance with at least one of the examples described herein. Process 400, as shown, may optionally start after process 100. However, any one or more of the steps in process 400 may also be performed in parallel to any one or more of the steps of processes 300, 200, or 100.

Process 400 begins at step 402. At step 402, the system electrically connects the second alternator to a second powernet.

At step 404, the system determines if the electrical power output of the second alternator satisfies a second electrical demand of the second powernet. For example, if the second alternator is generating enough electrical power to charge a second battery.

If the answer to step 404 is yes, process 400 continues to step 406. At step 406, the system charges a second battery electrically connected to the second alternator.

If the answer to step 406 is no, process 400 continues to step 408. At step 408, the system determines the state of charge of a second battery connected to the second alternator. For example, the system may determine that the state of charge of the second battery is at 35%.

At step 410, the system determines if the state of charge of the second battery is less than a second state of charge limit. For example, the system may determine that the 35% current state of charge of the second battery is less than a charge limit threshold, such as 40%.

If the answer to step 410 is no, process 400 continues to step 412. At step 412, the system discharges the second battery of the second powernet. For example, in this scenario, the battery state of charge is greater than the lower threshold or second charge limit, and therefore, although the alternator is not charging the battery at a sufficient rate, the system can continue to power the systems powered by the second powernet by discharging the second battery.

If the answer to step 410 is yes, as shown, the process 400 may optionally return to step 404. In some examples, the second powernet is connected to an eCAT with multiple heating elements, which may be selectively deactivated, if the engine after-treatment is at, or near, at optimal operating temperature, as will be described in more detail below.

In some examples, the steps as described with reference to FIGS. 3 and 4 have an order of preference or priority. For example, increasing the speed of the engine to increase the alternator speed is of first preference or priority as this is considered to be a simpler and easier way to meet the drive torque and accessory torque demand of the engine. However, in some examples, the operator of the engine may request more drive torque or the engine may be at maximum engine speed (e.g., RPMs).

In some examples, the second priority is to discharge a battery (or batteries) to support the electrical load(s) of the isolated electrical powernets, as described above. However, in some examples, the state of charge may not permit this solution for a large period of time.

In some examples, the third priority is to begin deactivating the non-critical 12V system loads, as described above with reference to FIG. 3. In this way, the electrical system demand will decrease and therefore the electrical accessory torque demand will also decrease. Similarly, in some examples, individual heating elements of the eCAT may be deactivated, however, these may be required to maintain engine after-treatment and therefore have high priority.

In some examples, the priority is: critical low voltage loads (e.g., 12V), which keep the vehicle operational; one or more elements of the eCAT; auxiliary loads (e.g., in hybrid vehicle applications, may have high voltage (48V+) powered components); non-critical low voltage (e.g., 12V) loads, such as heated seats and air conditioning units, and the like.

In a worst-case scenario, the engine after-treatment is cold (i.e., from "cold-start" conditions) and in a cold environment. In this scenario, the eCAT will be at max power demand, and the nominal 12V load systems of the first powernet will also be high, yet a reserve of crankshaft torque is required for vehicle launch. Accordingly, a combination of the order of preferred options above can be used to meet the starting conditions, as will be explained in more detail with regard to FIG. 7.

Figure 5:
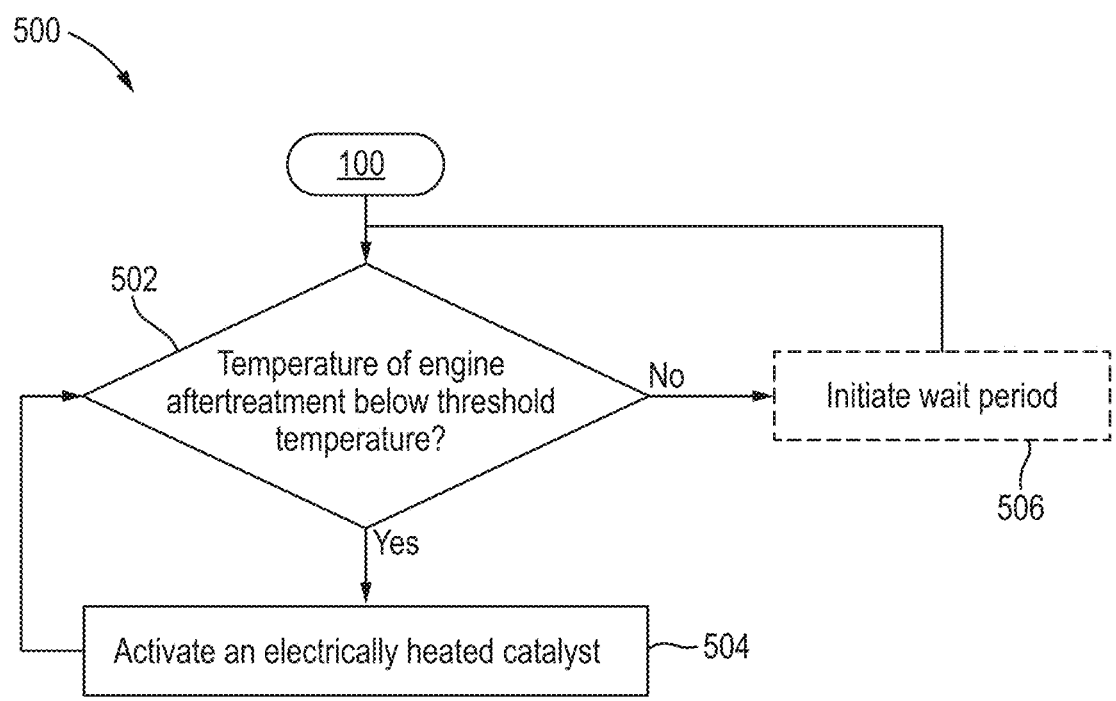
FIG. 5 illustrates an example flow chart of a method of determining the temperature of an engine after-treatment system, and taking subsequent actions, in accordance with at least one of the examples described herein.

FIG. 5 illustrates an example flow chart of a method of determining the temperature of an engine after-treatment system, and subsequent actions to be taken, in accordance with at least one of the examples described herein. Process 500, as shown, may optionally start after process 100. However, any one or more of the steps in process 500 may also be performed in parallel to any one or more of the steps of processes 400, 300, 200, or 100.

Process 500 starts at step 502. At step 502, the system determines if the temperature of an engine after-treatment is below a threshold temperature. If the response to step 502 is no, process 500 optionally continues to step 504.

At step 504, the system initiates a waiting period. For example, after determining that the temperate of the engine after-treatment is at the threshold temperature, rather than checking again immediately, a wait period can be started before reverting to step 502. In this way, computing resources can be saved, as changes in temperature of the after-treatment system typically take seconds to 10s of seconds. In some examples, step 504 is omitted and process 500 returns to step 502.

If the response to step 502 is yes, process 500 continues to step 506. At step 506, the system activates an eCAT. In some examples, the eCAT comprises a plurality of heating elements. In some examples, the eCAT comprises a catalyst disposed downstream of the plurality of heating elements.

In some examples, process 500 further comprises determining how many of a plurality of heating elements to selectively operate to achieve a threshold temperature of the catalyst, e.g., an optimum operating temperature of the catalyst (not shown). For example, it may be determined that to meet the threshold temperature, all of the heating elements will need to be operated. In some examples, it may be determined that to meet the threshold temperature, a subset of the plurality of heating elements will need to be operated.

In some examples, process 500 further comprises determining one or more, e.g., a subset, of the plurality of heating elements of the after-treatment system to deactivate, in response to the after-treatment system achieving a threshold temperature, e.g., an optimum operating temperature (not shown).

In some examples, selectively operating one or more heating elements of the eCAT comprises operating a pulse-width modulation (PWM) switch electrically connected to the heating elements to modulate power from a power source to the heating elements of the after-treatment system. In some examples, a solid-state relay is used to operate one or more heating elements of the eCAT. In some examples, a DCDC converter is used to operate the eCAT, which can provide more granular control such as modulation of the eCAT load by varying the input current and/or voltage to the eCAT, in addition to activation.

Figure 6:
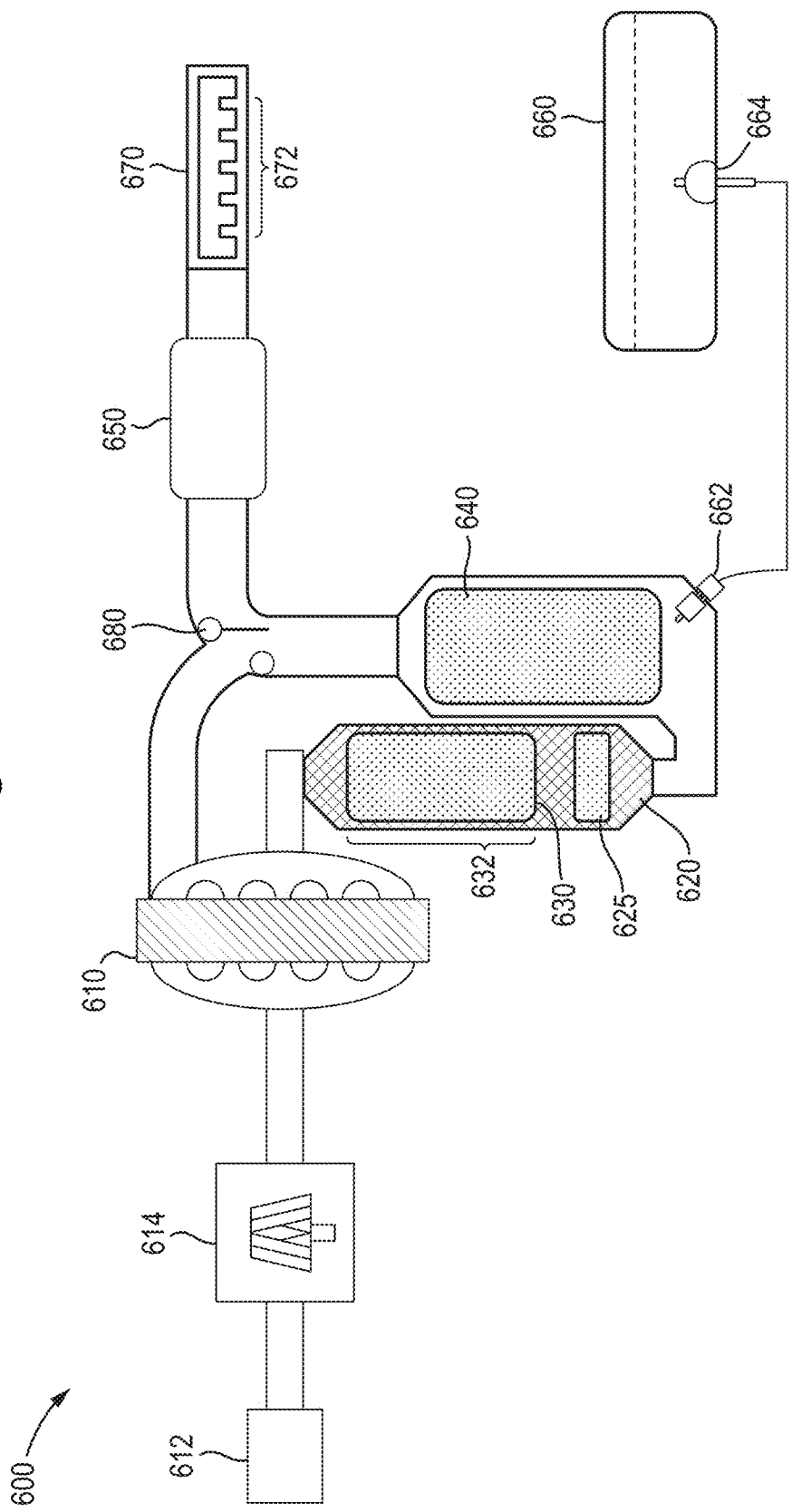
FIG. 6 illustrates an exemplary exhaust system comprising an engine and an engine after-treatment system, in accordance with at least one of the examples described herein.

FIG. 6 illustrates an exemplary exhaust system 600 comprising an engine 610 and an after-treatment system, comprising an eCAT 620. In some examples, the eCAT 620 comprises a catalyst 625 that is provided heat by the methods as described herein. In some examples, and as shown in FIG. 6, there is provided an air-box 612 fluidly connected to a compressor 614 to draw air from the atmosphere. The airbox 612 and compressor 614 are fluidly connected to engine 610 and the after-treatment system to transfer thermal energy from a plurality of heating elements 632 disposed within the heating module 630 within the after-treatment system to the rest of the after-treatment system (e.g., to the catalyst 625). In some examples, to support local emissions regulations, additional systems such as an e-compressor 614 may be required.

In some examples, there is a diesel particulate filter 640 downstream of engine 610. A diesel particulate filter (DPF) is a filter that captures and stores exhaust soot, coke, and/or char, collectively referred to as particulate matter. The DPF is another form of after-treatment utilized to reduce emissions from diesel cars. DPFs have a finite capacity, the trapped particulate matter periodically has to be emptied or 'burned off' to regenerate the DPF, which an eCAT may also be used to assist with. This regeneration process cleanly burns off the excess particular matter deposited in the filter, reducing the harmful exhaust emission. In some examples, selectively operating one or more of the heating elements of the heating module to provide heat to the catalyst may be based on an amount of particulate matter in the after-treatment system. For example, if the amount of particular matter within the after-treatment system is determined to be above a threshold, more heating elements of the heating module can be selectively operated to regenerate the after-treatment system (e.g., the DPF). However, when using the eCAT to assist in regenerating the DPF, in some examples, such a task may only be carried out when the electrical power output of the second alternator satisfies the second electrical demand of the second powernet (i.e., the answer to step 404 is yes), or, if the state of charge of the second battery is higher than the second state of charge limit (i.e., the answer to step 410 is no).

In some examples, there may also be a gasoline particulate filter (GPF) downstream of engine 610. The GPF would replace the DPF 640 of FIG. 6 in petrol-based engines. GPFs are an emission aftertreatment technology based on DPFs, developed to control particulate emissions from gasoline direct injection engines. The technology is also referred to as a petrol particulate filter (PPF). Typically, exhaust gases are forced through the GPF, wherein the trapped unwanted hydrocarbons, nitrous oxides, and carbon monoxide particulates are heated up and reduced to small amounts of carbon dioxide, nitrogen, and water.

In some examples, there is also provided a selective catalytic reduction (SCR) 650 system. An SCR is another emissions control technology system that injects a liquid-reductant agent through a special catalyst into the exhaust stream of engines, in particular diesel engines. The reductant source is usually automotive-grade urea, otherwise known as diesel exhaust fluid (DEF). The DEF sets off a chemical reaction that converts nitrogen oxides into nitrogen, water, and low amounts of carbon dioxide ($CO_2$), which is then expelled through the vehicle tailpipe 670. The DEF may be stored in a DEF tank 660. The DEF may be distributed through a number of pumps and valves 662 and 664, as shown in FIG. 6. The number of pumps and valves 662 and 664 are for illustration purposes and additional pumps and valves 662 and 664 may be located throughout the exhaust and/or after-treatment system. The location of the pumps and valves 662 and 664 are similarly for illustration purposes and the location of the pumps and valves 662 and 664 can be different from that shown in FIG. 6.

In some examples, the exhaust system comprises a plurality of sensors 672 to detect the flue gas containing oxides of nitrogen (NOx) and oxides of sulfur (SOx), to ensure the final emissions are within a regulation amount. Euro 5 exhaust emission legislation and Euro 6 exhaust emission legislation, have effectively made it mandatory for GPFs/DPFs, DEF, and SCRs to meet the emissions standards. However, in future emission legislation, such as Euro 7 due to be enforced from 2026, this technology alone may not be sufficient. The systems and embodiments described herein may replace, or work in conjunction with GPFs, DPFs, DEF, and SCRs and meet the future standards.

In some examples, the exhaust system comprises an exhaust gas recovery system, which is enabled by an EGR switch 680. The EGR switch 680 enables some or all exhaust gas, or the thermal energy of the exhaust gas, to be recirculated through the exhaust system to further compound the heating effect of the heating elements 632 within the heating module 630 to assist in catalyst 625 light off.

Figure 7:
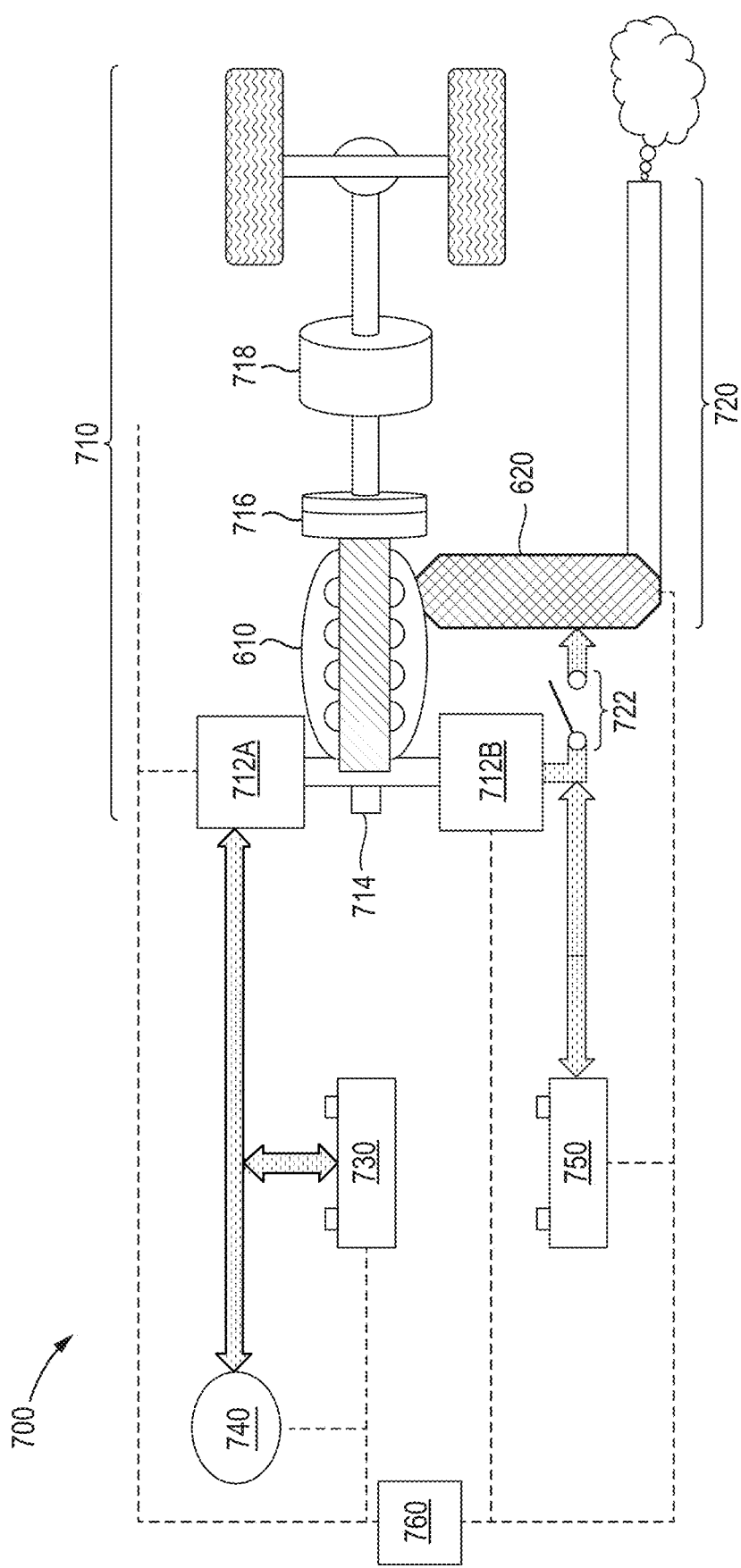
FIG. 7 illustrates an electrical power control system for a hybrid vehicle, in accordance with at least one of the examples described herein.

FIG. 7 shows a block diagram representing an electrical power control system 700 for a vehicle. In the example shown in FIG. 7, the power control system 700 is for an exemplary vehicle system architecture, in accordance with at least one of the examples described herein. Shown in FIG. 7 is a first alternator 712A and second alternator 712B, which is a device that may, in some examples, apply negative torque to the crankshaft of the engine 610 to generate electrical energy. The first and second alternators 712A-B may be referred to as electricity generators. In some examples, in the case of a hybrid vehicle, for example, the first alternator 712A and/or second alternator 712B may be an e-machine, such as a BISG, and therefore acts as a generator in some instances, but also provides positive torque in others. Accordingly, it is considered within the scope of the present disclosure that at least one of the first and second alternators is replaced an e-machine that can provide positive and negative torque to the crankshaft. As shown in the exemplary case in FIG. 7, the alternators are mechanically coupled to a crankshaft 714 of the engine 610 via the front-end accessory drive (FEAD). Accordingly, the first and second alternators 712A-B are driven by the torque output of the engine, along with, clutch 716, and transmission 718.

In some examples, the second alternator 712B replaces a hybrid system e-machine. For example, a large engine in a large vehicle, which would typically require a hybrid system to meet emissions standards may comprise a second low voltage (e.g., 12V) system and a second alternator to support an eCAT instead. Such an approach is very cost-effective compared to the hybrid system e-machine as there is no need for a hybrid battery, which is very costly.

In some examples, the crankshaft 714 transmits torque to the alternators 712A-B when operating as a generator, converting kinetic energy from the moving vehicle back into electricity. In some examples, the first alternator 712A and second alternator 712B are electrically isolated from each other.

In some examples, engine 610 has an exhaust system 720 comprising an eCAT 620, as described with reference to FIG. 6 above. In some examples, the eCAT is electrically connected to a solid-state relay or PWM switch, or DCDC converter 722. In some examples, switch 722 electrically connects a plurality of heating elements 632 to the eCAT 620.

In the example shown in FIG. 7, the first alternator 712A is electrically connected to a first low voltage (e.g., 12V) battery and bus 730, which is configured to supply electrical power to one or more low voltage accessories 740 of the vehicle. In some examples, the one or more low voltage accessories 740 comprise one or more of: lights, heated seats, heated steering wheel, heated windscreen, power steering, infotainment system, base loads (modules), wipers, cameras, or the like.

In the example shown in FIG. 7, the second alternator 712B is electrically connected to a second low voltage (e.g., 12V) battery and bus 750, which is configured to supply electrical power to the eCAT 620. The first low voltage battery and bus 730 and the second low voltage battery and bus 750 are electrically isolated from one another.

In the example shown in FIG. 7, the power control system 700 comprises a controller 760, e.g., an engine control module (ECM), may be in operational communication with each of the first and second alternators 712A-B, the engine 610, the first low voltage battery and bus 730, the eCAT 620, the DCDC converter or PWM/solid-state relay switch 722, low voltage vehicle systems and accessories 740, and the second low voltage battery and bus 750.

The present disclosure is not limited to the set-up shown in FIG. 7. For example, the controller 760 may be a stand-alone controller or any other appropriate controller of the vehicle. For example, the controller may, at least in part, be integrated with another controller of the vehicle. Furthermore, the controller 760 may be configured to operationally communicate with any one or more of the vehicle components shown in FIG. 7, and/or any other appropriate components of the vehicle. For example, controller 760 may be a stand-alone controller configured to operationally communicate with at least one low voltage accessory, a first and second alternator, the engine 610, and an eCAT 620, to control and balance engine torque demands.

While the example shown in FIG. 7 exemplifies the use of the control system 700 for a vehicle, it is understood that the control system 700 may be implemented on an appropriate type of vehicle, such as a plug-in hybrid electric vehicle (PHEV), having, in addition, one or more high voltage circuit components. System 700, shown in FIG. 7, is configured to provide, by way of an isolated second low voltage battery and bus, electrical power to the eCAT 620 via DCDC converter or PWM switch 722, as described in the examples above and below.

Figure 8A:
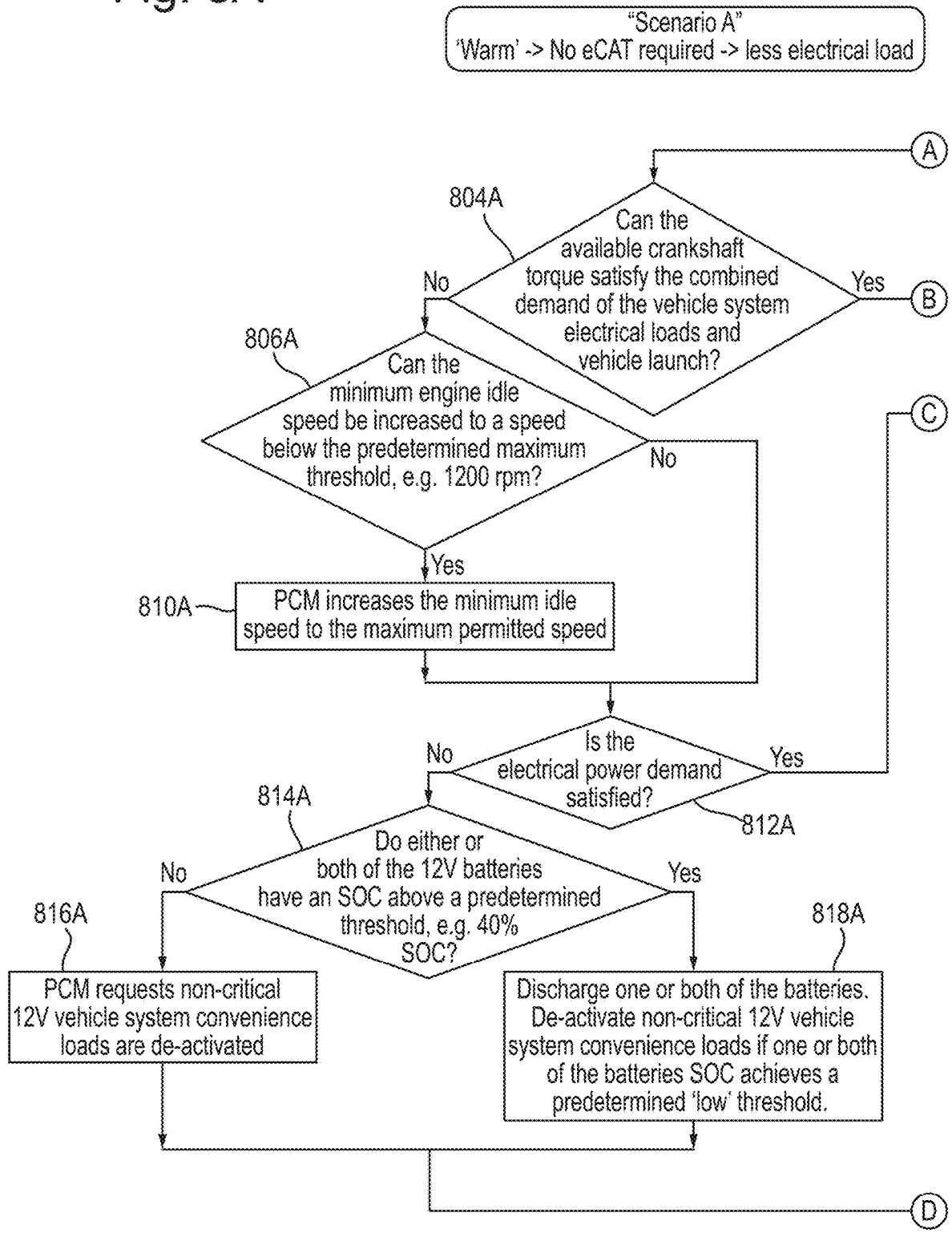
FIGS. 8A-8C illustrates an example flow chart of a method of controlling engine torque based on the electrical load in an after-treatment system for a vehicle, in accordance with at least one of the examples described herein.
Figure 8B:
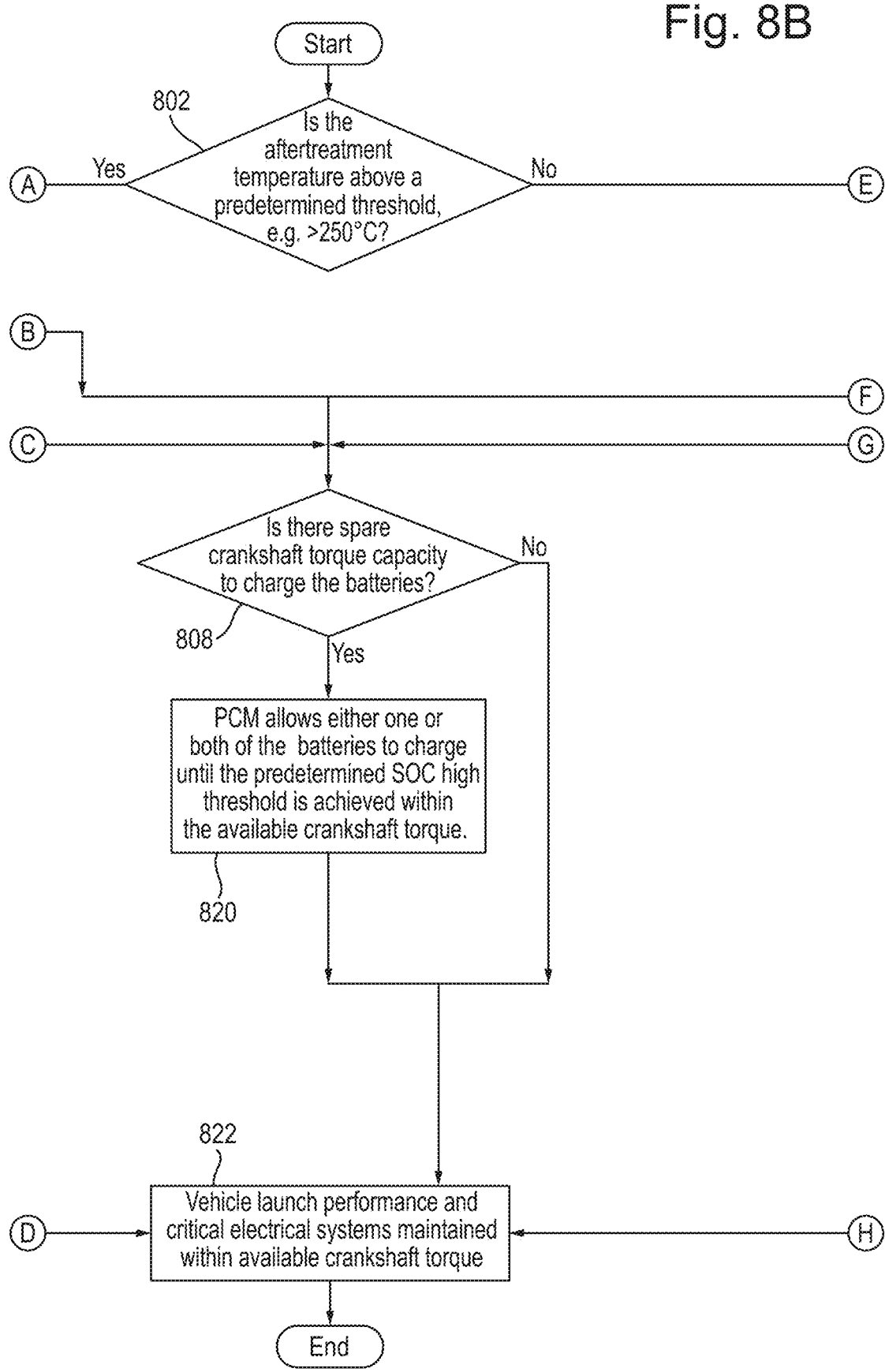
Figure 8C:
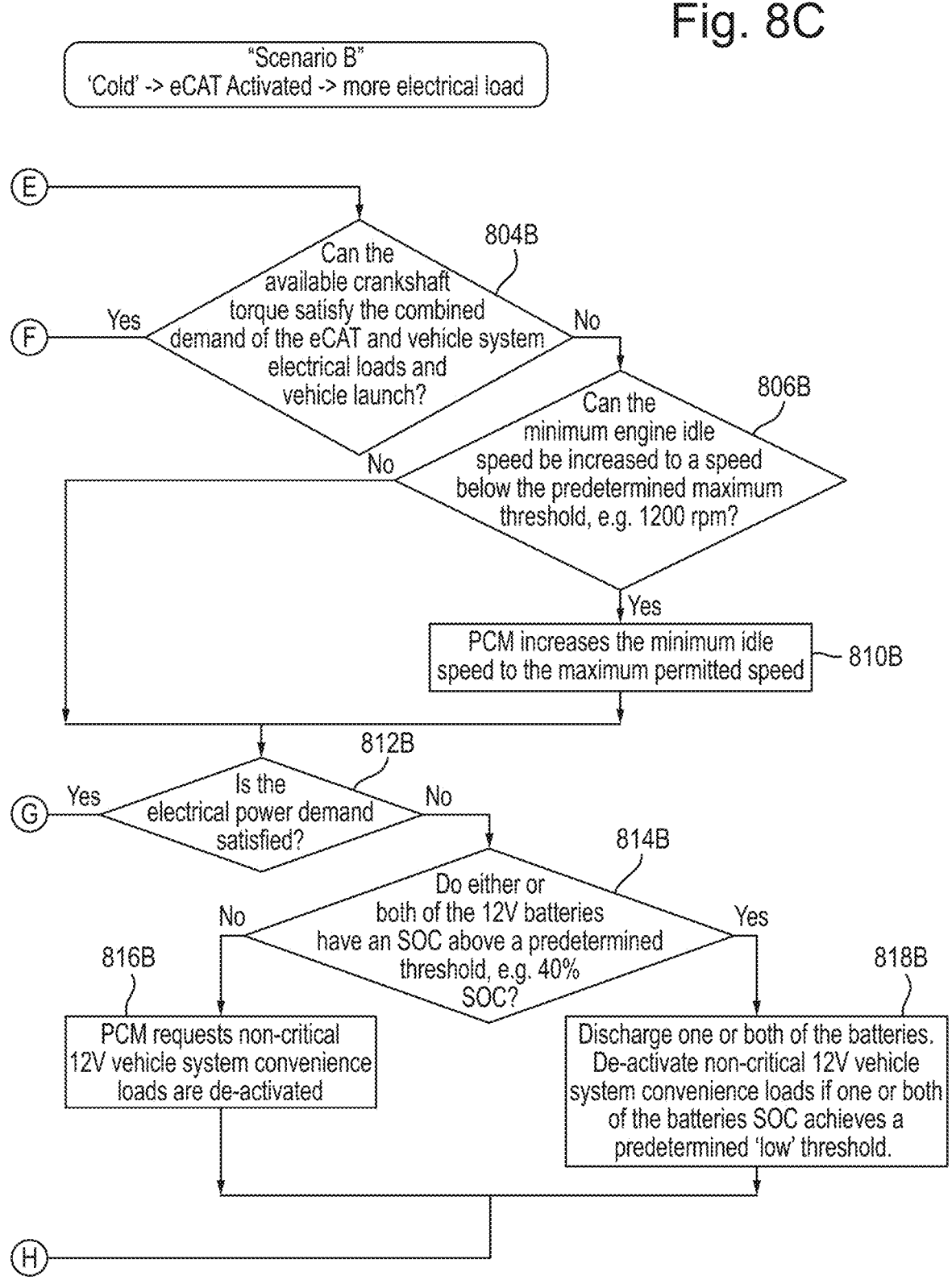

The systems and methods disclosed herein are to elevate a concern with dual alternator systems that the additional load placed on the engine crankshaft 714 by a second alternator 712B may degrade vehicle launch performance or even stall the engine in some use cases, especially for applications with downsized or 'small'/'less' displacement engine or when the 12V vehicle systems are demanding high power scenarios (e.g., when the vehicle is cold and in the dark; heating on, lights on, etc). Therefore, proposed is a control strategy for balancing and/or controlling the torque at the crankshaft, to satisfy the loads and maintain engine idling quality and launch performance. FIGS. 8A-8C below are an exemplary decision matrix/flow chart strategy, e.g., in its entirety.

As will be seen below, the variables to be controlled are the engine speed, the minimum engine idle speed can be increased to increase the alternator speed and therefore output current; turning off non-critical low voltage (e.g., 12V) loads to reduce crank torque demand; and the charge accepted by, and the discharge of, the batteries to satisfy the load without stifling the crankshaft torque.

FIGS. 8A-8C illustrate an example flow chart of a method of controlling engine torque based on the electrical load in an after-treatment system for a vehicle, in accordance with at least one of the examples described herein. As shown, FIG. 8A can be considered to be one of two scenarios, "Scenario A" (e.g., a "warm start," wherein no eCAT assistance is needed in catalyst light-off, and therefore less electrical load is required), and FIG. 8C is "Scenario B" (e.g., a "Cold Start," wherein the eCAT is required to assist in catalyst light-off to meet emissions standards, and therefore a greater electrical load will be created). Accordingly, as shown in FIGS. 8A and 8C, many steps in "Scenario A" have an equivalent in "Scenario B".

Process 800 starts at step 802. At step 802, the system determines if the after-treatment temperature is above a predetermined threshold (e.g., 250 degrees Celsius). In some examples, the time threshold can be updated to be higher or lower. In some examples, the time threshold can be increased based on one or more contextual factors and/or operational parameters. For example, if the ambient temperature is relatively high, the temperature of the catalyst will be at a higher starting point and temperature fall-off will be less severe. Step 802 also determines whether the system is in "Scenario A" as shown in FIG. 8A or "Scenario B" as shown in FIG. 8C. If the answer to step 802 is yes, process 800 continues to step 804A (via route A). If the answer to step 802 is no, process 800 continues to step 804B (via route E).

At step 804A/B, the system determines if the available crankshaft torque satisfies the combined demand of the vehicle system's electrical loads and vehicle launch. Similar to FIGS. 3 and 4. If the answer to step 804A/B is yes, process 800 continues to step 808 (via route B/F), which will be discussed below. If the answer to step 804A/B is no, process 800 continues to step 806A/B.

At step 806A/B, the system determines if the minimum engine idle speed can be increased to a speed below the predetermined maximum threshold (e.g., 1200 RPM). If the answer to step 806A/B is yes, process 800 continues to step 810A/B, which will be discussed below. If the answer to step 806A/B is no, process 800 continues to step 812A/B.

At step 808, the system determines if there is spare crankshaft torque capacity to charge the batteries. If the answer to step 808 is yes, process 800 continues to step 820, which will be discussed below. If the answer to step 808 is no, process 808 continues to step 822, which will be discussed below.

At step 810A/B, the system increases the minimum idle speed to the maximum permitted speed. After step 810A/B process 800 continues to step 812A/B.

At step 812A/B, the system determines if the electrical power demand is satisfied. If the answer to step 812A/B is yes, process 800 reverts back to step 808 (via route C/G). If the answer to step 812A/B is no, process 800 continues to step 814A/B.

At step 814A/B, the system determines if either or both of the batteries (e.g., 12V) have a state of charge above a predetermined threshold (e.g., 40% state of charge). If the answer to step 814A/B is yes, process 800 continues to step 818A/B, which will be discussed below. If the answer to step 814A/B is no, process 800 continues to step 816A/B below.

At step 816A/B, the PCM request non-critical low voltage (e.g., 12V) vehicle system convenience (i.e., non-critical)

loads are de-activated. After step 816A/B, process 800 continues to step 822 (via route D/H), which will be discussed below.

At step 818A/B, the system discharges one or both of the batteries (e.g., 12V), and de-activates non-critical 12V vehicle system convenience loads (i.e., non-critical loads) if one or both of the batteries state of charge achieves a pre-determined minimum (e.g., low) threshold. After step 818A/B process 800 continues to step 822 (via route D/H), which will be discussed below.

At step 820, the PCM (e.g., controller 760) allows either one or both of the batteries (e.g., 12V) and buses 730 and 750 to charge until the predetermined state of charge minimum (e.g., high) threshold is achieved within the available crankshaft torque. After step 820, process 800 continues to step 822, discussed below.

At step 822, the vehicle launch is performed and critical electrical systems are maintained within the available crankshaft torque (e.g., torque output from the engine). After step 822, process 800 ends.

For clarity, and to avoid unnecessary repetition, with reference to FIGS. 8A-8C and the description above, wherein a step comprises 8xxA/B, this should be understood to refer to step 8xxA and/or 8xxB. The A/B tag refers to "Scenario A" or "Scenario B" as discussed above.

Figure 9:
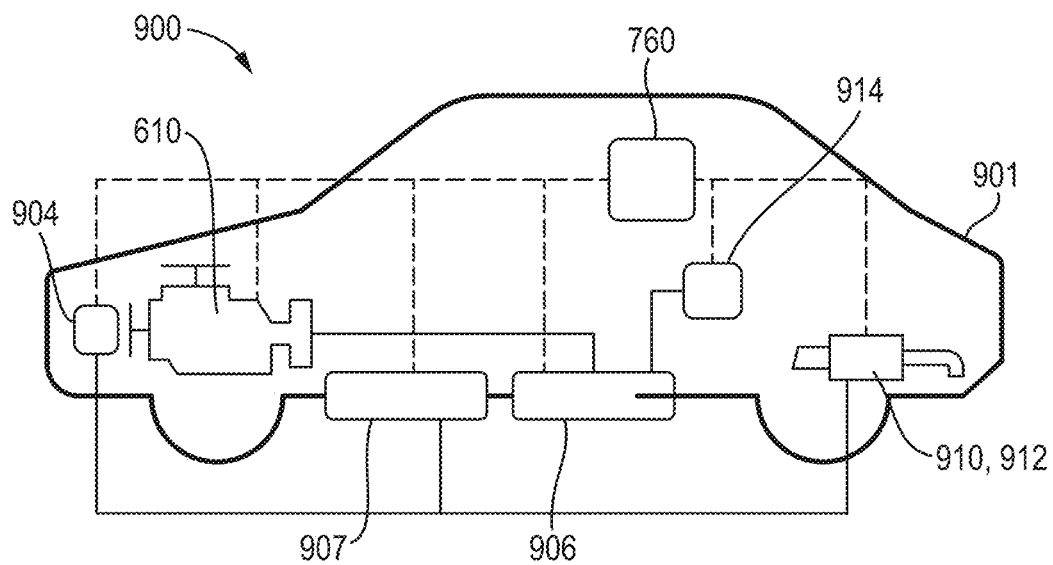
FIG. 9 illustrates a vehicle comprising an engine and an exemplary exhaust system, in accordance with at least one of the examples described herein.

FIG. 9 illustrates a vehicle comprising an engine and an exemplary exhaust system, in accordance with at least one of the examples described herein. According to some examples, there is provided a vehicle 901 comprising an electrical power control system 900, in accordance with some examples of the disclosure. In the example shown in FIG. 9, the vehicle 901 comprises an engine 610 coupled to two generators, e.g., a first and second alternator 904. The alternators 904 are electrically coupled (illustrated by the solid line connectors) to a first battery 906 and second battery 907, respectively. The first battery 906 and the second battery 907 are electrically isolated from each other. The vehicle also comprises an electrically heated catalyst (eCAT) 910, which is configured to help reduce hydrocarbon and NOX emissions in the exhaust gas flowing from engine 610 to exhaust 912. In the example shown in FIG. 9, the eCAT 910 is electrically coupled to the second battery 907. Also in the example shown in FIG. 9, the first battery 906 is coupled to a low voltage (e.g., 12V) bus 914, which is configured to supply electrical power to one or more low voltage systems of the vehicle.

In the example shown in FIG. 9, the control system 900 comprises a controller 760, e.g., a powertrain control module (PCM), in operational communication (illustrated by the dashed line connectors) with each of the engine 610, the alternators 904, the first battery 906 the second battery 907, the low voltage bus 914, and the eCat 710. However, the present disclosure is not limited to the set-up shown in FIG. 9. For example, the controller 760 may be any appropriate type of controllers, such as a stand-alone controller, or any other appropriate controller of the hybrid vehicle. For example, the controller 760 may, at least in part, be integrated with another controller of the vehicle. Furthermore, the controller 760 may be configured to operationally communicate with any one or more of the vehicle components shown in FIG. 6 or FIG. 7, and/or any other appropriate components of the vehicle. For example, controller 760 may be a stand-alone controller at least partially configured to operationally communicate with at least one low voltage accessory, an electric generator, and an eCAT, to control torque demand on the engine 610. Furthermore, it is understood that controller 760 may be configured to carry out one or more of the above-disclosed electrical power control methods for a hybrid vehicle, as described above.

Figure 10:
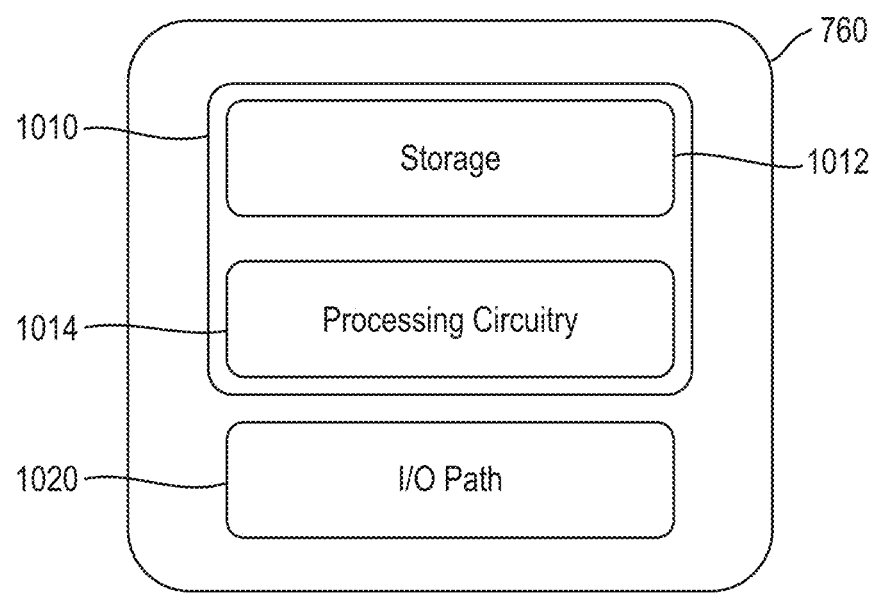
FIG. 10 depicts an exemplary control circuitry, in accordance with at least one of the examples described herein.

FIG. 10 depicts an exemplary control circuitry, in accordance with at least one of the examples described herein. Controller 760 includes control circuitry 1010, which comprises storage 1012 and processing circuitry 1014, and I/O path 1020. Controller 760 may be based on any suitable processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, e.g., processing circuitry may be distributed across multiple separate processors, multiple of the same type of processors (e.g., two Intel Core i9 processors), or multiple different processors (e.g., an Intel Core i7 processor and an Intel Core i9 processor).

Storage 1012, and/or storage of other components of other vehicle controllers, may be electronic storage devices. As referred to herein, the phrase "electronic storage device" or "storage device" should be understood to mean any device for storing electronic data, computer software, or firmware, such as random-access memory, read-only memory, hard drives, and the like, and/or any combination of the same. In some examples, controller 760 executes instructions for an application stored in memory (e.g., storage 1012). Specifically, controller 760 may be instructed by an application to perform the methods/functions discussed herein. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory (RAM), etc.

Additionally or alternatively, controller 760 may be configured to transmit and/or receive data via I/O path 1020. For instance, I/O path 1020 may include a communication port(s) configured to transmit and/or receive data from at least one of an engine control module, a powertrain control module, and a vehicular system control module, such as an eCAT and/or exhaust system control module. Control circuitry 1010 may be used to send and receive commands, requests, and other suitable data using I/O path 1020. I/O path 1020 may connect control circuitry 1010 (and specifically processing circuitry 1014) to one or more communications paths (described below). I/O functions may be provided by one or more of these communications paths, but are shown as a single path in FIG. 10 to avoid overcomplicating the drawing.

Control circuitry 1010 may include communications circuitry (not shown) suitable for communicating with a server or other networks or servers. The instructions for carrying out the above-mentioned methods and systems may be stored on the guidance application server. Communications circuitry may include a cable modem, integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-topeer communication of user equipment devices or communication of user equipment devices in locations remote from each other.

As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder or PVR), solid-state devices, quantum storage devices, gaming consoles, gaming media, or any other suitable fixed or removable storage devices, and/or any combination of the same. Storage 1012 may be used to store various types of content described herein. Nonvolatile memory may also be used (e.g., to launch a boot-up routine and other instructions). Cloud-based storage may be used to supplement storage 1012 or instead of storage 1012.

A user may send instructions to control circuitry 1010 using a user input interface (not shown). The user input interface may be any suitable user interface, such as a remote control, mouse, trackball, keypad, keyboard, touchscreen, touchpad, stylus input, joystick, voice recognition interface, or other user input interfaces.

It should be understood that the examples described above are not mutually exclusive with any of the other examples described with reference to FIGS. 1-10. The order of the description of any examples is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

Other variations to the disclosed embodiments can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

This disclosure is made to illustrate the general principles of the systems and processes discussed above and is intended to be illustrative rather than limiting. More generally, the above disclosure is meant to be exemplary and not limiting and the scope of the disclosure is best determined by reference to the appended claims. In other words, only the claims that follow are meant to set bounds as to what the present disclosure includes.

While the present disclosure is described with reference to particular example applications, it shall be appreciated that the disclosure is not limited thereto. It will be apparent to those skilled in the art that various modifications and improvements may be made without departing from the scope and spirit of the present disclosure. Those skilled in the art would appreciate that the actions of the processes discussed herein may be omitted, modified, combined, and/or rearranged, and any additional actions may be performed without departing from the scope of the disclosure.

Any system feature as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some, and/or all features in one aspect can be applied to any, some, and/or all features in any other aspect, in any appropriate combination. It should also be appreciated that particular combinations of the various features described and defined in any aspect can be implemented and/or supplied and/or used independently.

What is claimed is:

1. A method of controlling engine torque, the method comprising:
    determining a drive torque demand on a crankshaft of an engine;
    determining an accessory torque demand on the crankshaft, the accessory torque demand comprising a first torque demand from a first e-machine and a second torque demand from a second e-machine;
    determining whether the sum of the drive torque demand and the accessory torque demand is greater than a usable torque capacity output from the engine crankshaft;
    increasing a speed of the engine in response to determining that the sum of the drive torque demand and the accessory torque demand is greater than the usable torque capacity output from the engine crankshaft; and
    electrically connecting the first e-machine to a first powernet and electrically connecting the second e-machine to a second powernet, wherein the first powernet and the second powernet are electrically isolated from each other.

2. The method of claim 1, wherein increasing the speed of the engine comprises increasing an idle speed of the engine to a predetermined limit.

3. The method of claim 1, the method further comprising:
    determining whether an electrical power output from the first e-machine satisfies a first electrical demand of the first powernet; and/or
    determining whether an electrical power output from the second e-machine satisfies a second electrical demand of the second powernet.

4. The method of claim 3, the method further comprising:
    determining a state of charge of a first battery electrically connected to the first e-machine in response to determining that the electrical power output from the first e-machine does not satisfy the first electrical demand; and
    deactivating one or more electrical components of the first powernet in response to the state of charge of the first battery being less than a predetermined first state of charge limit; or
    discharging the first battery of the first powernet in response to the state of charge of the first battery being above the predetermined first state of charge limit.

5. The method of claim 3, the method further comprising:
    determining a state of charge of a second battery electrically connected to the second e-machine in response to determining that the electrical power output from the second e-machine does not satisfy the second electrical demand; and
    discharging the second battery of the second powernet in response to the state of charge of a second battery being above a predetermined second state of charge limit.

6. The method of claim 3, the method further comprising:
charging a first battery electrically connected to the first e-machine in response to determining that the electrical power output from the first e-machine satisfies the first electrical demand of the first powernet; and/or
charging a second battery electrically connected to the first e-machine in response to determining that the electrical power output from the second e-machine satisfies the second electrical demand of the second powernet.

7. The method of claim 1, wherein the second powernet comprises an electrically heated catalyst, the method further comprising:
determining whether the temperature of an engine after-treatment system is below a predetermined temperature threshold; and
activating the electrically heated catalyst in response to the temperature of an engine after-treatment system being below the predetermined temperature threshold.

8. An engine comprising a crankshaft, the engine being coupled to a first e-machine, a second e-machine and a controller, wherein the controller is configured to:
determine a drive torque demand on a crankshaft of an engine;
determine an accessory torque demand on the crankshaft, the accessory torque demand comprising a first torque demand of the first e-machine and a second torque demand of the second e-machine;
determine whether the sum of the drive torque demand and the accessory torque demand is greater than a usable torque capacity output from the crankshaft;
increase a speed of the engine in response to determining that the sum of the drive torque demand and the accessory torque demand is greater than the usable torque capacity output from the crankshaft; and
electrically connect the first e-machine to a first powernet and electrically connect the second e-machine to a second powernet, wherein the first powernet and the second powernet are electrically isolated from each other.

9. The engine of claim 8, wherein increasing the speed of the engine comprises increasing an idle speed of the engine to a predetermined limit.

10. The engine of claim 8, the controller further configured to:
determine whether an electrical power output from the first e-machine satisfies a first electrical demand of the first powernet; and/or
determine whether an electrical power output from the second e-machine satisfies a second electrical demand of the second powernet.

11. The engine of claim 10, the controller further configured to:
determine a state of charge of a first battery electrically connected to the first e-machine in response to determining that the electrical power output from the first e-machine does not satisfy the first electrical demand; and
deactivate one or more electrical components of the first powernet in response to the state of charge of the first battery being less than a predetermined first state of charge limit;
or discharge the first battery of the first powernet in response to the state of charge of the first battery being above the predetermined first state of charge limit.

12. The engine of claim 10, the controller further configured to:
determine a state of charge of a second battery electrically connected to the second e-machine in response to determining that the electrical power output from the second e-machine does not satisfy the second electrical demand; and
discharge the second battery of the second powernet in response to the state of charge of a second battery being above a predetermined second state of charge limit.

13. The engine of claim 10, the controller further configured to:
charge a first battery electrically connected to the first e-machine in response to determining that the electrical power output from the first e-machine satisfies the first electrical demand of the first powernet; and/or
charge a second battery electrically connected to the first e-machine in response to determining that the electrical power output from the second e-machine satisfies the second electrical demand of the second powernet.

14. The engine of claim 8, wherein the second powernet comprises an electrically heated catalyst, the method further comprising:
determining whether the temperature of an engine after-treatment system is below a predetermined temperature threshold; and
activating the electrically heated catalyst in response to the temperature of an engine after-treatment system being below the predetermined temperature threshold.

15. A vehicle comprising the engine of claim 8.

16. A non-transitory computer-readable medium having instructions encoded thereon for carrying out a method of controlling engine torque, that, when executed by control circuitry, cause the control circuitry to:
determine a drive torque demand on a crankshaft of an engine;
determine an accessory torque demand on the crankshaft, the accessory torque demand comprising a first torque demand from a first e-machine and a second torque demand from a second e-machine;
determine whether the sum of the drive torque demand and the accessory torque demand is greater than a usable torque capacity output from the engine crankshaft;
increase a speed of the engine in response to determining that the sum of the drive torque demand and the accessory torque demand is greater than the usable torque capacity output from the engine crankshaft; and
electrically connect the first e-machine to a first powernet and electrically connect the second e-machine to a second powernet, wherein the first powernet and the second powernet are electrically isolated from each other.

* * * * *